March 27, 1928.
A. VANDERPUT
1,664,337
MEAT ROLL FORMING MACHINE
Filed Feb. 11, 1925
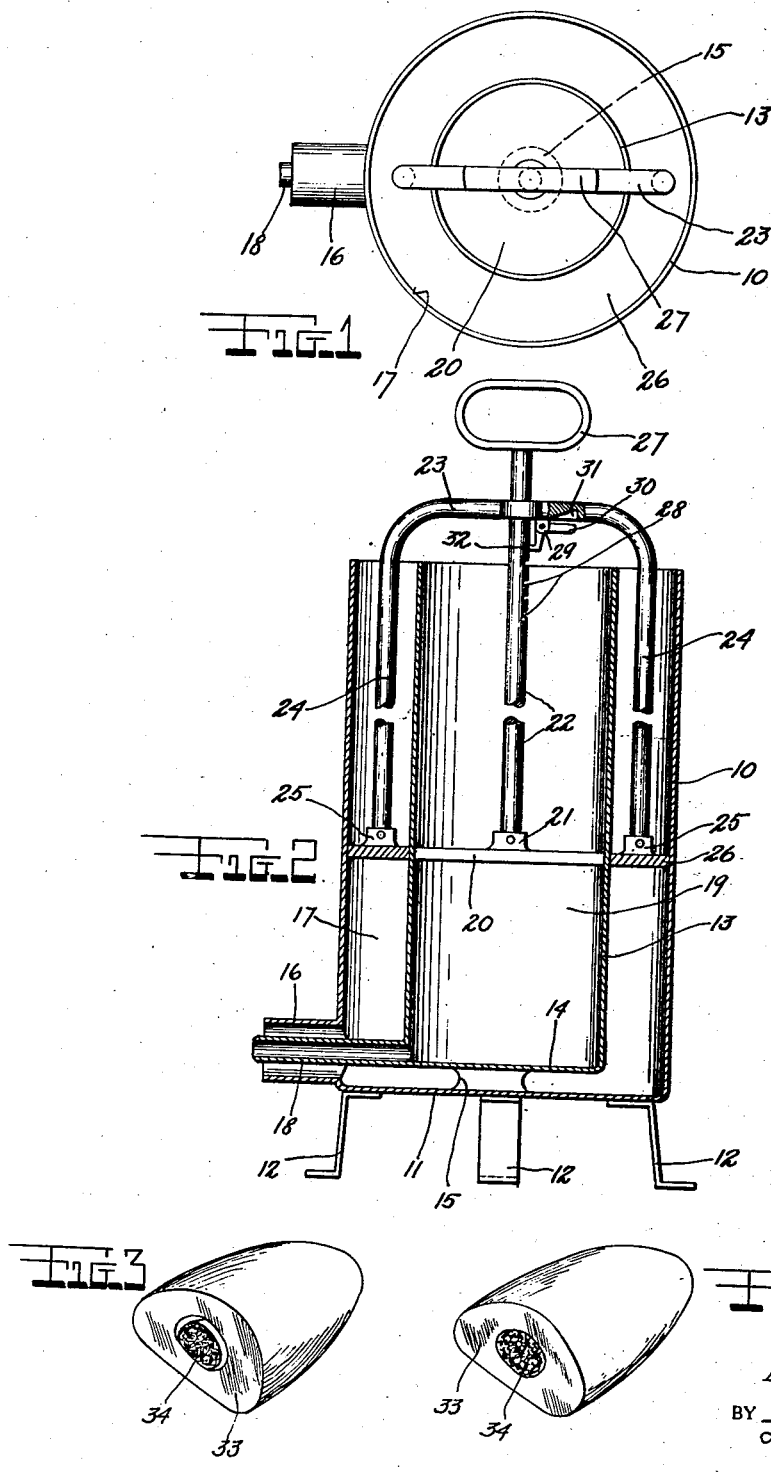
INVENTOR
A. Vanderput
BY
ATTORNEY Patented Mar. 27, 1928.

1,664,337

UNITED STATES PATENT OFFICE.

ANTHONY VANDERPUT, OF PATERSON, NEW JERSEY, ASSIGNOR OF ONE-HALF TO JAMES C. HINCHLIFFE, JR.

MEAT-ROLL-FORMING MACHINE.

Application filed February 11, 1925. Serial No. 8,369.

The main object of this invention is to provide a meat roll similar to a sausage in which the roll consists of two elements, an inner portion consisting of chopped meat and an outer portion which entirely envelops the meat consisting of a dough. When baked, the dough of the sausage expands and increases in size and the meat therein is roasted. As the meat is entirely enveloped, the gravy ensuing from baking operation is contained in the sausage and serves to retain the flavor and make a delectable article.

Another object is to provide a machine which emits dough in circular form and a quantity of meat simultaneously within the central opening of the dough.

These and other objects will become apparent in the description below, in which characters of reference refer to like-named parts in the drawing.

Referring briefly to the drawing, Figure 1 is a top plan view of the sausage making machine.

Figure 2 is a sectional side elevational view of the same.

Figure 3 is a perspective view of a cross-sectional cut of the sausage after being baked.

Figure 4 is a similar view of the sausage before being baked.

Referring in detail to the drawing, the numeral 10 indicates an outer cylindrical wall which is provided with a bottom 11, said bottom being supported on legs 12. An additional smaller container 13 is mounted axially within the larger container 10 and its bottom 14 is raised above the bottom 11 and the larger container by being supported on a lug 15. Extending radially from the lower portion of the container 10, directly above the bottom 11, is a spout 16 which communicates with the chamber 17 of the larger container. A similar and smaller spout 18 passes axially thru the larger spout 16 and communicates with the chamber 19 of the smaller container 13 directly above the bottom 14. The smaller spout 18 projects partly beyond the edge of the larger spout 16. A circular flange 20 is slidable within the chamber 19 of the container 13 and is provided with a hub 21 in which the lower end of a rod 22 is pivoted. Said rod is slidably mounted in the connecting arm 23 of a U-shaped rod which has two parallel extending portions 24, the latter passing downwardly into the chamber 17 of the larger container at diametrically opposite positions and have their lower ends fixed in the hubs 25 mounted on an annular flange 26 which is slidable in the annular chamber created between the inner wall of the container 10 and the outer wall of the container 13. The rod 22 at its upper end is provided with a grip handle 27 and intermediate its length, a plurality of notches 28 are cut into the periphery of said rod, the purpose of which being more fully hereinafter described. On the underside of the arm 23 and adjacent the position where the rod 22 is slidable therein, an ear 29 is mounted. This ear pivotally supports a bell crank 30 whose longer arm normally hangs horizontally and when lifted registers in a recess 31 provided in the arm 23 adjacent the ear 29. The substantially vertical arm of the bell crank 30 has a small angular extension 32 thereon which engages any of the notches 28 and retains the rod 22 rigidly in any of the adjusted positions.

The machine is used in the following manner. A dough of stiff consistency is inserted into the chamber 17 and fills up the space between the inner wall of member 10 and outer wall of member 13 beneath the annular flange 26 and also the space between the bottom 14 and bottom 11. A chopped raw meat of any combination is inserted into the chamber 19, both chambers 17 and 19 being filled when the flanges 26 and 20 have been removed from their positions in the container. When the chambers are filled and the flanges have been slid into the containers, downward pressure on the grip handle squeezes out a circular length of dough 33 with a hole therein from the mouth of the spout 16. Simultaneously with the movement of the dough from the spout 16, a length of chopped meat is also urged outwardly from the chamber 19 and thru the spout 18, the chopped meat being positioned in the opening of the dough. These portions are urged out from the spouts 16 and 18 then closed at their ends completely enveloping and sealing the meat portion of the roll within the dough. The meat roll when completely formed, is then consigned to the bake oven and baked a desired length of time suitable for transforming the dough. The chopped meat 34 within the dough also is exposed to the baking with the result that thru this baking, the meat contracts forming a gravy which is retained in the meat roll. Thus the meat roll formed with this machine has an advantage of entirely enveloping a length of chopped meat and also retains the juices of the baked meat within the roll, thus flavoring the dough of said roll retaining the meat therein hermetically sealed.

The adjustment provided by the notches 26 cooperating with member 32 is for the purpose of accomplishing a variation of the distance between members 20 and 26. This adjustment compensates for the differences in texture between different kinds of dough. In a leavened dough, two grades are generally mixed, one called old dough which is permitted to rise and be punched several times before being baked, and young dough which has received one punching only. When the outer annular chamber has been filled with young dough, more meat rolls can be made with a given volume than were this same container to be filled with old dough, as the latter is more heavy per unit of volume. When using young dough, it would be necessary to lift or raise member 20 above member 26 a required distance so that more meat material may be filled into the cylinder 19 to compensate for the additional number of rolls which may be thrown out of the machine thru the use of young dough. The reverse holds true when old dough is used. When using either old or young dough, the ends of the roll as it leaves the spouts or funnels 16 and 18 are open, but these ends gradually close over the more solid meat core during the process of final leavening. This is the natural consequence in all kinds of baking in which fillings are used.

I claim:—

1. A machine for making meat rolls comprising an upright container having a bottom, an additional smaller container having a bottom, the bottom of the smaller container being raised above that of said upright container, a spout on the larger container, a spout on the smaller container passing axially thru the spout of the larger container, the material passing thru the spout of the larger container being cylindrical in shape, the spout of the smaller container being adapted to fill the opening of the cylindrical material with additional material simultaneously, a plunger and an annular follower slidable in said containers, a U-shaped member secured to the annular follower mounted in the larger container, a rod slidably mounted in the U-shaped member and secured to the plunger of the smaller container, and means for securing the rod in adjusted positions with respect to the follower in the larger container.

2. A machine for making meat rolls comprising an upright container having a bottom, an additional smaller container having a bottom, the bottom of the smaller container being raised above that of said upright container, a spout on the larger container, a spout on the smaller container passing axially thru the spout of the larger container, the material passing thru the spout of the larger container being cylindrical in shape, the spout of the smaller container being adapted to fill the opening of the cylindrical material with additional material simultaneously, a plunger and an annular follower slidable in said containers, a U-shaped member secured to the annular follower mounted in the larger container, a rod slidably mounted in the U-shaped member and secured to the plunger of the smaller container, notches cut on said rod, a bell crank pivoted on the U-shaped member adapted to engage any of said members to retain the rod releasably in position.

In testimony whereof I affix my signature.

ANTHONY VANDERPUT.